(12) United States Patent
Westerberg

(10) Patent No.: US 7,559,194 B2
(45) Date of Patent: Jul. 14, 2009

(54) METHOD AND DEVICE FOR CONTROLLING THE INJECTION OF REDUCING AGENT

(75) Inventor: Björn Westerberg, Södertälje (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/586,552

(22) PCT Filed: Dec. 22, 2004

(86) PCT No.: PCT/SE2004/001984

§ 371 (c)(1), (2), (4) Date: Sep. 14, 2006

(87) PCT Pub. No.: WO2005/068797

PCT Pub. Date: Jul. 28, 2005

(65) Prior Publication Data

US 2007/0125071 A1 Jun. 7, 2007

(30) Foreign Application Priority Data

Jan. 20, 2004 (SE) .................................. 0400104

(51) Int. Cl.
*F01N 3/00* (2006.01)

(52) U.S. Cl. .............................. 60/286; 60/274; 60/276; 60/297; 60/301; 701/103; 701/115; 703/7; 703/8

(58) Field of Classification Search .................. 60/274, 60/276, 286, 295, 297, 301, 303; 701/102, 701/103, 115; 703/7, 8
See application file for complete search history.

(56) References Cited

U.S. PATENT DOCUMENTS

| 5,628,186 | A | 5/1997 | Schmelz | |
|---|---|---|---|---|
| 5,950,422 | A * | 9/1999 | Dolling | 60/274 |
| 6,004,524 | A | 12/1999 | Morsbach et al. | |
| 6,119,448 | A | 9/2000 | Emmerling et al. | |
| 6,742,330 | B2 * | 6/2004 | Genderen | 60/286 |
| 6,981,368 | B2 * | 1/2006 | van Nieuwstadt et al. | 60/277 |
| 6,993,900 | B2 * | 2/2006 | Upadhyay et al. | 60/286 |
| 7,073,465 | B2 * | 7/2006 | Woll et al. | 123/1 A |

(Continued)

FOREIGN PATENT DOCUMENTS

EP 1 164 266 A2 12/2001

OTHER PUBLICATIONS

International Search Report PCT/SE2004/001984 dated Mar. 15, 2005 (Swedish Patent Office).

*Primary Examiner*—Binh Q. Tran
(74) *Attorney, Agent, or Firm*—Ostrolenk, Faber, Gerb & Soffen, LLP

(57) ABSTRACT

The invention relates to a method and device (10) for controlling the injection of reducing agent upstream from a catalyst (4) in an exhaust line (2) from a combustion engine. According to the invention, the injection of reducing agent in the exhaust line is controlled on the basis of result of comparison between a calculated accumulation actual value (A1) and a calculated accumulation setpoint value (A2). The invention also relates to a computer program comprising program code for implementing said method, a computer program product comprising a medium which is readable by an electronic control unit and has stored on it a computer program intended to cause an electronic control unit to implement said method, and an electronic control unit.

20 Claims, 7 Drawing Sheets

U.S. PATENT DOCUMENTS

| | | |
|---|---|---|
| 7,200,990 B2 * | 4/2007 | Gabrielsson et al. .......... 60/286 |
| 7,204,081 B2 * | 4/2007 | Yasui et al. ................... 60/286 |
| 2003/0036841 A1 | 2/2003 | Xu et al. |
| 2003/0182935 A1 | 10/2003 | Kawai et al. |
| 2004/0055284 A1 | 3/2004 | Ripper et al. |
| 2004/0074229 A1 | 4/2004 | Upadhyay et al. |

* cited by examiner

METHOD AND DEVICE FOR CONTROLLING THE INJECTION OF REDUCING AGENT

CROSS REFERENCE TO RELATED APPLICATION

The present application is a 35 U.S.C. §§ 371 national phase conversion of PCT/SE2004/001984, filed 22 Dec. 2004, which claims priority of Swedish Application No. 0400104-6, filed 20 Jan. 2004. The PCT International Application was published in the English language.

FIELD OF THE INVENTION, AND STATE OF THE ART

The present invention relates to a method and a device for controlling the injection of reducing agent upstream from a catalyst in an exhaust line from a combustion engine. The invention also relates to a computer program comprising program codes for implementation of said method, a computer program product comprising a medium which is readable by an electronic control unit and has stored on it a computer program intended to cause an electronic unit to implement said method, and an electronic control unit.

To meet prevailing exhaust cleaning requirements, today's motor vehicles are usually provided with a catalyst in the exhaust line for effecting catalytic conversion of environmentally harmful components of exhaust gases to environmentally less harmful substances. One method employed for achieving effective catalytic conversion is based on injection of a reducing agent in the exhaust gases upstream from the catalyst. A reducing substance forming part of or formed by the reducing agent is carried by the exhaust gases into the catalyst, in which it is adsorbed on active seats in the catalyst, thereby causing storage (accumulation) of the reducing substance in the catalyst. The stored reducing substance may either desorb, i.e. become detached from the active seats, or react with an exhaust gas substance so as to convert said exhaust gas substance to a harmless substance. Such a reduction catalyst may for example be of SCR type (SCR=Selective Catalytic Reduction). This type of catalyst is hereinafter called SCR catalyst. An SCR catalyst selectively reduces $NO_x$ in exhaust gases but not the oxygen in exhaust gases. In the case of an SCR catalyst, a reducing agent in the form of urea or ammonia is usually injected in the exhaust gases upstream from the catalyst. Injection of urea into exhaust gases results in the formation of ammonia and it is this ammonia that constitutes the reducing substance which assists the catalytic conversion in the SCR catalyst. The ammonia is accumulated in the catalyst by being adsorbed on active seats in the catalyst, and $NO_x$ present in the exhaust gases is converted to nitrogen and water by being brought into contact with ammonia accumulated on active seats in the catalyst.

When a reduction catalyst is used in combination with proportioning of reducing agent, it is important to control the injection of the reducing agent so that desired conversion of the exhaust gas substance concerned is achieved without allowing excessive amounts of unconsumed reducing substance to accompany the exhaust gases leaving the catalyst and thereby reach the environment. The consumption of reducing agent and the relating costs can thereby be minimised while at the same time preventing or at least minimising undesired release of the reducing substance to the environment. The fact, for example, that ammonia is a reducing substance which is toxic and malodorous makes it desirable to minimise to the utmost possible extent the release of this ammonia to the environment while maintaining the injection of sufficient reducing agent, e.g. in the form of urea, for achieving the required conversion of the exhaust gas substance concerned, in this case $NO_x$.

When a catalyst of the type here concerned is used, the injection of reducing agent is at the present time usually controlled on the basis of two-dimensional tables, each of which is related to a certain exhaust gas temperature. Each table comprises values for the amount of reducing agent to be injected in the exhaust line at the respective load and speed of the combustion engine concerned. Each table thus has engine load on a first axis and engine speed on a second axis. These tables are compiled empirically by charting the behaviour of the respective combustion engine and catalyst on the basis of performance in steady-state conditions. Such charting has to be done for each specific combination of combustion engine and catalyst, and this previously known solution also involves extensive trial runs and settings for each specific combination of engine type and catalyst type. Any changes in, for example, engine emissions entail having to make extensive and detailed changes to all the values in the tables. As the tables give proportioning adapted to steady-state conditions, dynamic compensations have to be applied in cases where operating conditions change quickly. A further disadvantage of the known solution is that, despite dynamic compensations, operating conditions for which the tables do not cater can occur, which may lead to incorrect proportioning of reducing agent.

OBJECT OF THE INVENTION

The object of the present invention is to provide a method which enables easy and reliable control of the injection of reducing agent upstream from a catalyst in an exhaust line from a combustion engine so that amounts of reducing agent which are appropriate to prevailing operating conditions can be injected.

SUMMARY OF THE INVENTION

According to the invention, said object is achieved by means of a method of the invention.

The solution according to the invention involves:
- an accumulation actual value representative of current accumulation in the catalyst of a reducing substance forming part of or formed by the reducing agent being calculated on the basis of information from a computation model which, taking into account the reactions in the catalyst under prevailing operating conditions, continuously determines the current state of the catalyst, e.g. the accumulation of the reducing substance in different parts of the catalyst and the conversion of exhaust gas substance taking place in different parts of the catalyst,
- an accumulation setpoint value being calculated on the basis of an emission setpoint value and information from said computation model, whereby the emission setpoint value is representative of a desired content, in the exhaust gases leaving the catalyst, of an exhaust gas substance which, as the exhaust gases pass through the catalyst, is at least partly removed from the exhaust gases by the action of the reducing substance or is formed by the action of the reducing substance, and the accumulation setpoint value is representative of the accumulation of the reducing substance which is required in the catalyst under prevailing operating conditions for substantially achieving the emission setpoint value, the accumulation actual value being compared with the accumulation setpoint value, and the injection of reducing agent in the exhaust line being controlled on the basis of the result of the comparison between the accumulation actual value and the accumulation setpoint value.

The solution according to the invention makes it possible easily and reliably to control the injection of reducing agent upstream from a catalyst in an exhaust line from a combustion engine so that suitable amounts of reducing agent can be injected, based on prevailing operating conditions, for achieving a desired conversion of the exhaust gas substance concerned. Taking the current reducing substance accumulation in the catalyst into account makes it possible to control the proportioning of reducing agent with good accuracy so that the desired conversion of the exhaust gas substance is accomplished while at the same time the amount of unconsumed reducing substance which accompanies the exhaust gases leaving the catalyst and thereby reaches the environment is limited. It thus becomes possible to minimise the consumption of reducing agent and the relating costs while at the same time preventing or at least minimising undesired release of reducing agent to the environment. The computation model used need only be adapted to the catalyst and is therefore independent of the design of the combustion engine connected to the catalyst. Using a computation model which is only tied to the catalyst and not to the combustion engine results in a very flexible method which, when adapted to a specific catalyst, can be used for that catalyst together with any desired combustion engine. It is also possible to use a scalable computation model which can easily be adapted to the dimensions of the catalyst.

According to an embodiment of the method according to the invention, a limitation factor is calculated, which limitation factor has a value based on an estimate of the current risk that the reducing substance content of the exhaust gases leaving the catalyst might exceed a predetermined limit value, whereby this limitation factor is taken into account in calculating the accumulation setpoint value in such a way that the accumulation setpoint value decreases in response to increasing risk that the reducing substance content of the exhaust gases leaving the catalyst might exceed the predetermined limit value. It thus becomes possible to eliminate or at least minimise the risk that undesired amounts of unconsumed reducing substance might accompany the exhaust gases leaving the catalyst and thereby reach the environment.

A further embodiment of the method according to the invention is characterised by:

an emission actual value being established by calculation or measurement, which emission actual value is representative of the current content of the exhaust gas substance in the exhaust gases leaving the catalyst, the emission actual value being compared with the emission setpoint value, and the accumulation setpoint value being calculated on the basis of information from said computation model and the conformity between the emission actual value and the emission setpoint value.

The fact of thus causing the conformity between the emission actual value and the emission setpoint value to affect the accumulation setpoint value makes it possible to calculate the accumulation setpoint value by an approximation method, since the influence on the accumulation setpoint value of the conformity between the emission actual value and the emission setpoint value makes it possible to compensate for deviations arising between desired and actual emissions of the exhaust gas substance. The calculated accumulation setpoint value thus need not correspond exactly to the reducing substance accumulation required for achieving the emission setpoint value.

Further embodiments of the method according to the invention are indicated by the description set out below.

The invention also relates to a device for utilizing the method according to the invention.

The invention also relates to a data program which is loadable directly to the internal memory of a computer and which comprises program codes for implementation of the method according to the invention.

The invention also relates to a computer program product comprising a medium which is readable by an electronic control unit and which has stored on it a computer program intended to cause an electronic control unit to implement the method according to the invention.

The invention also relates to an electronic control unit.

BRIEF DESCRIPTION OF THE DRAWINGS

The invention is described in more detail below on the basis of examples of embodiments with reference to the attached drawings, which are as follows.

DETAILED DESCRIPTION OF EMBODIMENTS

Figure 1:
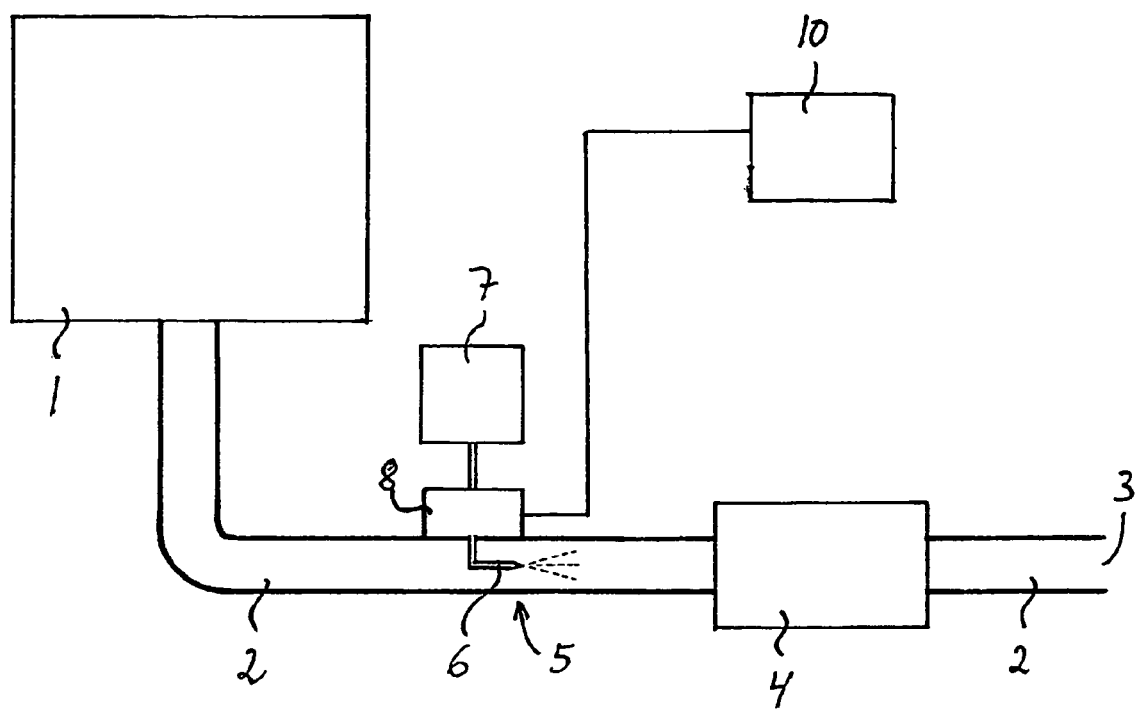
FIG. 1 a schematic diagram of a combustion engine with a relating catalyst and a device according to the invention, FIG. 2 a block diagram illustrating a first embodiment of the device according to the invention, FIG. 3 a block diagram illustrating a second embodiment of the device according to the invention, FIG. 4 a block diagram illustrating an electronic control unit for implementation of the method according to the invention, FIG. 5 a flowchart illustrating a method according to a first embodiment of the present invention, FIG. 6 a flowchart illustrating a method according to a second embodiment of the present invention, FIG. 7 a flowchart illustrating a method according to a third embodiment of the present invention, and FIG. 8 a flowchart illustrating a method according to a fourth embodiment of the present invention, and FIG. 9 a flowchart illustrating a method according to a fifth embodiment of the present invention.

FIG. 1 depicts schematically a combustion engine 1 provided with a device 10 according to the invention. The exhaust gases leaving the combustion engine 1 pass through an exhaust line 2 and reach the environment via an exhaust outlet 3. A reduction catalyst 4, preferably in the form of an SCR catalyst, is arranged in the exhaust line 2. The exhaust gases from the combustion engine 1 are thus caused to pass through this catalyst 4 before reaching the environment via the exhaust outlet 3. An injection point 5 for reducing agent is situated in the exhaust line 2 upstream from the catalyst 4. The injection of reducing agent takes place via an injection device comprising one or more injection means 6 arranged in the exhaust line, in the form of injection nozzles or the like, and a reducing agent storage tank 7 connected thereto. The injection device further comprises a proportioning unit 8, which itself comprises proportioning means and a regulating means, e.g. a control valve or the like, arranged to regulate the supply of reducing agent to said injection means 6. The proportioning unit 8 is controlled by a device 10 according to the present invention which determines the amount of reducing agent to be injected in the exhaust gases.

Figure 2:
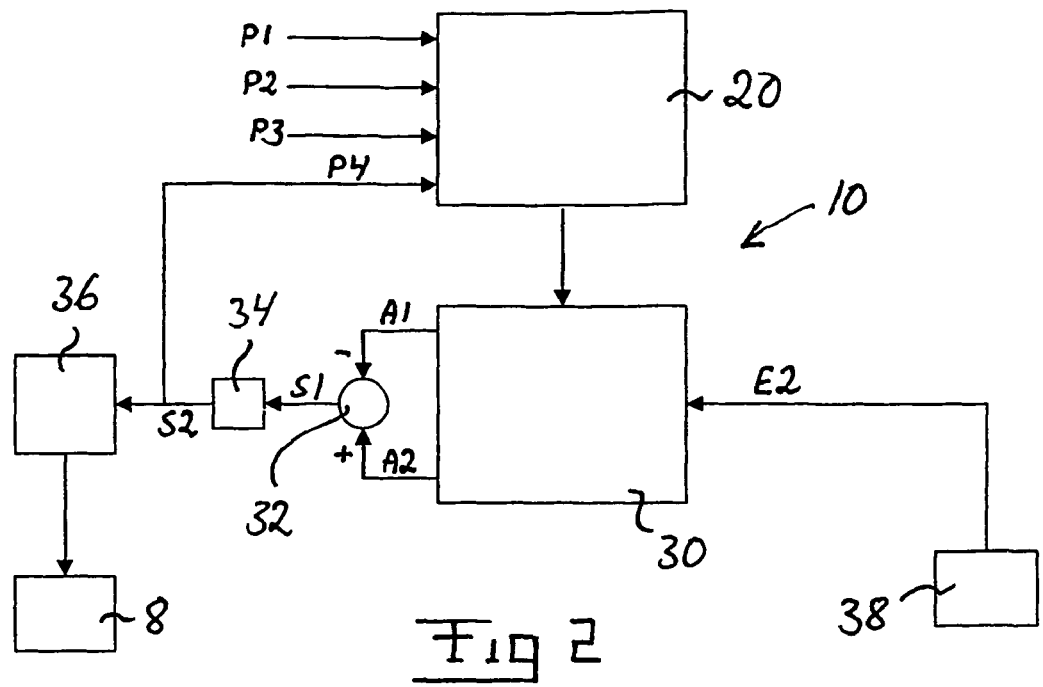

FIG. 2 illustrates a first embodiment of a device 10 according to the invention. The device 10 comprises a first calculation means 20 adapted to determining continuously, by use of a computation model, the current state of the catalyst, taking into account the expected reactions in the catalyst under prevailing operating conditions. The computation model takes into account the expected exothermal and endothermal reactions in the catalyst 4 under prevailing operating conditions and calculates inter alia the accumulation of the reducing substance concerned in different parts of the catalyst, and the conversion of the exhaust gas substance concerned which takes place in different parts of the catalyst. The computation model may be of any desired design provided that it produces with the desired accuracy a correct value for the accumulation of the reducing substance and the conversion of the exhaust gas substance in the catalyst. An example of a computation model suitable in the context is described below.

The device 10 further comprises a second calculation means 30 adapted to calculating, on the basis of information from the first computation means 20, an accumulation actual value A1 representative of the current accumulation in the catalyst 4 of the reducing substance which forms part of or is formed by the reducing agent. The second computation means 30 is also adapted to calculating an accumulation setpoint value A2 on the basis of an emission setpoint value E2 and information from said computation model. This emission setpoint value E2 is representative of a desired content, in the exhaust gases leaving the catalyst 4, of an exhaust gas substance which, as the exhaust gases pass through the catalyst, is at least partly removed from the exhaust gases by the action of the reducing substance or is formed by the action of the reducing substance. The emission setpoint value E2 provides a measure of the maximum permissible emission of the exhaust gas substance and may inter alia be controlled by statutory exhaust emission requirements. The emission setpoint value E2 has in the simplest case a constant value but is preferably determined by calculation in a computation means 38 in a conventional manner on the basis of prevailing operating conditions, e.g. the speed and load of the combustion engine. The accumulation setpoint value A2 is representative of the reducing substance accumulation required in the catalyst under prevailing operating conditions for achieving or at least substantially achieving the emission setpoint value E2. The first computation means 20 and the second computation means 30 are with advantage integrated in a common computer unit but may, if considered appropriate, take the form of separate units connected to one another.

The device 10 further comprises a comparator 32 adapted to receiving the accumulation actual value A1 and the accumulation setpoint value A2 from the second computation means 30. The comparator 32 is adapted to comparing the accumulation actual value A1 and the accumulation setpoint value A2 and to emitting a signal S1 which depends on the conformity, e.g. the difference, between this actual value A1 and setpoint value A2. The device 10 also comprises regulating means 34, 36 for controlling the injection of reducing agent on the basis of said signal S1 from the comparator 32. Said regulating means comprise with advantage a regulator 34, preferably in the form of a PI regulator or PID regulator, adapted to receiving the signal S1 from the comparator 32. On the basis of that signal S1, the regulator 34 emits a control signal S2 to a control means 36 connected to the proportioning unit 8 of the injection device and adapted to controlling this proportioning unit on the basis of said control signal S2 so that an amount of reducing agent appropriate to prevailing conditions is injected in the exhaust line 2.

The control signal S2 from the regulator 34 may also be led to the first computation means 20 in order to be used in the computation model, as a measure of the amount of reducing agent injected, when generating information for the next calculation of accumulation actual value A1 and accumulation setpoint value A2. Alternatively, the first computation means 20 may be adapted to receiving from the control means 36 a value representing the amount of reducing agent injected, as illustrated in FIG. 3.

Figure 3:
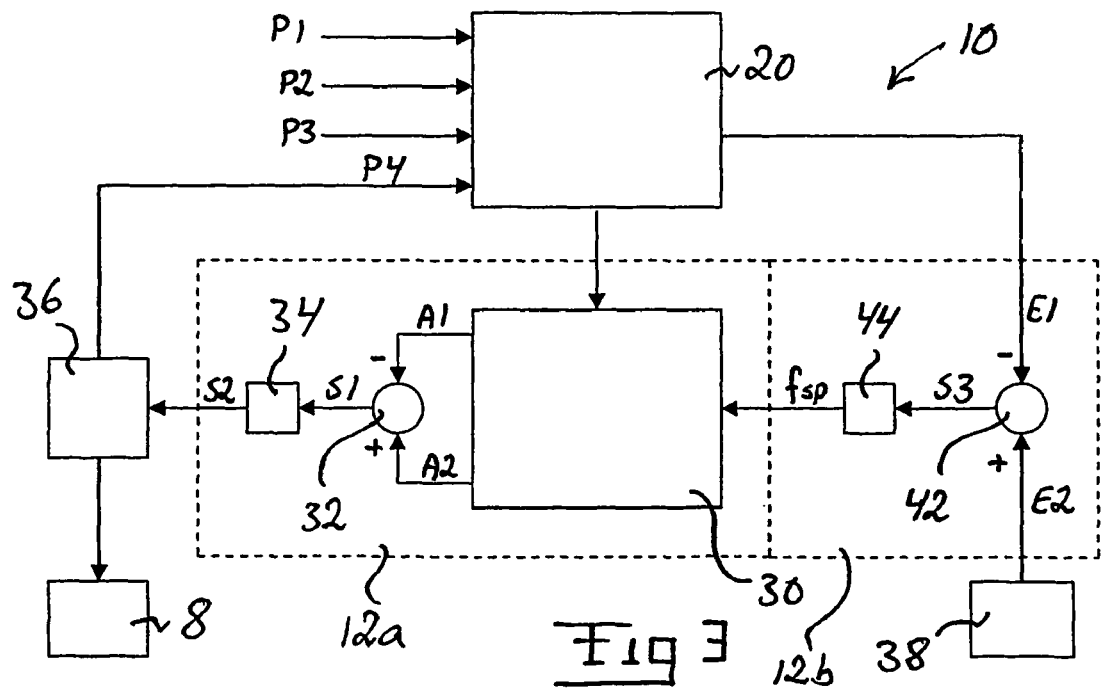

FIG. 3 illustrates a second embodiment of a device 10 according to the invention. The components which appear both in the embodiment described above with reference to FIG. 2 and in the embodiment according to FIG. 3 are denoted by the same reference notations. In the embodiment according to FIG. 3, the device 10 likewise comprises means for determining by calculation or measurement an emission actual value E1 representative of the current exhaust gas substance content of the exhaust gases leaving the catalyst 4. In cases where the emission actual value E1 is determined by calculation, this is preferably done in the first computation means 20 by using the abovementioned computation model or in a separate computation means on the basis of information from that computation model. In cases where the emission actual value E1 is determined by measurement, this is done by a measuring means arranged in the exhaust line downstream from the catalyst 4.

In the embodiment according to FIG. 3, the second computation means 30 is adapted to calculating the accumulation setpoint value A2 on the basis of information from the first computation means 20 and the conformity between the emission actual value E1 and the emission setpoint value E2. In this case the device 10 comprises a comparator 42 adapted to receiving the emission actual value E1 and the emission setpoint value E2. The comparator 42 is adapted to comparing the emission actual value E1 and the emission setpoint value E2 and to emitting a signal S3 which depends on the conformity, e.g. the difference, between this actual value E1 and setpoint value E2. The device 10 comprises with advantage a regulator 44, preferably in the form of a PI regulator or PID regulator, which is adapted to receiving the signal S3 from the comparator 42. On the basis of that signal S3 the regulator 44 emits a control signal $f_{SP}$ to the second computation means 30, which then determines the accumulation setpoint value A2 on the basis of that control signal $f_{SP}$ and the information from the first computation means 20 so that the accumulation setpoint value A2 is to the necessary extent compensated for undesired deviations between the emission actual value E1 and the emission setpoint value E2.

In the embodiment according to FIG. 3, regulation is applied in the form of so-called cascade regulation whereby the second computation means 30, the comparator 32 and the regulator 34 constitute an inner regulating circuit 12a which sets a necessary reducing substance accumulation in the catalyst by acting upon the proportioning of the reducing agent, and whereby the comparator 42 and the regulator 44 constitute an outer regulating circuit 12b which sets a desired emission of the exhaust gas substance by acting, via the inner regulating circuit 12a, upon the level of the necessary accumulation of the reducing substance in the catalyst.

Figure 4:
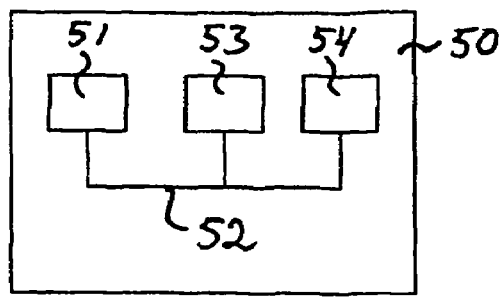

Program codes for implementation of the method according to the invention are preferably adapted to forming part of a computer program directly loadable to the internal memory of a computer, e.g. to the internal memory of the aforesaid computer unit. Such a computer program is provided with advantage via a computer program product comprising a storage medium which is readable by a computer and on which the computer program is stored. Said storage medium takes the form, for example, of an optical storage medium in the form of a CD-ROM disc, a DVD disc etc., or of a magnetic storage medium in the form of a hard disc, a diskette, a cassette tape etc. FIG. 4 illustrates an electronic control unit 50 comprising a means 51, preferably a central processor unit (CPU), for execution of software, which communicates via a databus 52 with a memory 53, e.g. of the RAM type. The control unit 50 also comprises at least one storage medium 54, e.g. in the form of a memory of the ROM, PROM, EPROM or EEPROM type or a Flash memory, which the execution means 51 communicates with via the databus 52. A computer program comprising program codes for implementation of the method according to the invention is stored in the storage medium 54.

The reducing agent preferably takes the form of urea (CO(NH$_2$)$_2$) but may also take the form of, for example, ammonia (NH$_3$) or hydrocarbon (fuel). In the ensuing description it is assumed that the catalyst 4 is an SCR catalyst and that a reducing agent in the form of urea or ammonia is used. It should be noted, however, that the solution according to the invention is not limited to this type of reduction catalyst and this type of reducing agent. Injecting urea into exhaust gases results in the formation of ammonia and it is this ammonia that constitutes the reducing substance which assists the catalytic conversion in the SCR catalyst. In this case the exhaust gas substance concerned takes the form of NO$_x$.

The aforesaid computation model is with advantage designed to use the following parameters as input values:

a) The exhaust gas temperature P1 upstream from the catalyst 4. This temperature may be determined by temperature sensor or in any of the conventional ways of calculating it.

b) The NO$_x$ concentration P2 in the exhaust gases upstream from the catalyst 4. This concentration may be determined by sensor but is determined with advantage in any of the conventional ways of calculating it, e.g. on the basis of the combustion engine's load, speed, injection angle, i.e. the angle of the combustion engine's crankshaft at the time of fuel injection into the engine cylinders, and, where applicable, the EGR content (EGR=Exhaust Gas Recirculation), i.e. the content of exhaust gases led back to the engine.

c) The exhaust gas mass flow P3 through the catalyst 4. This exhaust gas mass flow may be determined by mass flow sensor but is determined with advantage in any of the conventional ways for calculating it, e.g. on the basis of the combustion engine's load and speed.

d) The amount P4 of reducing agent injected in the exhaust gases. The value for the amount of reducing agent injected is obtained with advantage from the control means 36 or from the regulator 34.

The computation model may also use as input value the O$_2$ concentration in the exhaust gases upstream from the SCR catalyst and/or the ambient temperature. The O$_2$ concentration may be determined by, for example, lambda sensor but is determined with advantage in any of the conventional ways for calculating it, e.g. on the basis of the combustion engine's load, speed and, where applicable, EGR content.

A design of computation model is described below which it is advantageous to use for obtaining information for calculating the aforesaid accumulation actual value A1, accumulation setpoint value A2 and, where applicable, emission actual value E1 which pertain to a method and a device according to the present invention.

In an SCR catalyst, nitrogen oxide NO$_x$ reacts with ammonia and is reduced to nitrogen gas. NO$_x$ is the harmful exhaust gas substance intended to be removed from the exhaust gases, and ammonia is the reducing substance used for achieving this. Ammonia or urea (which converts to ammonia) is injected in the exhaust gases upstream from the SCR catalyst. The computation model is used to determine how much NO$_x$ is converted in the SCR catalyst and how much unconsumed ammonia leaves the SCR catalyst. The computation model also calculates continuously how the temperature varies across the catalyst and how much ammonia is accumulated in different parts of the catalyst. This involves the computation model being continuously supplied with information about the magnitude of the gas flow through the catalyst and the temperature and composition of the gas flowing into the catalyst.

A number of reactions take place in the SCR catalyst. Ammonia is adsorbed on active seats in the catalyst, resulting in accumulation of ammonia in the catalyst. The accumulated ammonia may either desorb, i.e. become detached from the active seats, or react with NO$_x$. At high temperatures, oxidation of ammonia with oxygen also takes place to a certain extent. The factor which decides how much NO$_x$ is converted in the catalyst is the reaction velocities r$_i$ of the various reactions. The reactions and their relating reaction velocities are as follows:

  (1)

  (2)

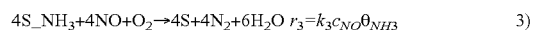  (3)

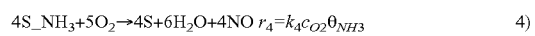  (4)

where k$_i$ is the velocity constant for reaction i, c$_i$ is the concentration of substance i, $\theta_V$ is the proportion of vacant seats, and $\theta_{NH3}$ is the proportion of seats occupied by ammonia. The reaction velocities r$_i$ are temperature-dependent in accordance with the Arrhenius equation:

$$k_i = k_{0,i} e^{-\frac{E_{A,i}}{RT}}$$

where k$_{0,i}$ is constant for reaction i, E$_{A,i}$ is the activation energy for reaction i, R is the general gas constant, and T is the temperature.

To determine the composition of the exhaust gases after the catalyst and how much ammonia is accumulated in different parts of the SCR catalyst, a number of material balances are solved according to the computation model. As the SCR catalyst has a monolithic structure, the gas flows through small channels whereby the walls between the channels contain the active catalyst material. The catalyst is modelled by regarding the flow through a channel as divided into a number of segments. The material balances are solved successively from the segment at the catalyst's inlet to the segment at the catalyst's outlet. From the flow through the channel, NO$_x$ and ammonia are transported up to the wall of the duct, where these substances react. To take into account the effect of the velocity at which the substances are transported up to the channel wall and into the channel wall, the channel wall is likewise divided into a number of segments. As all the material balances in the wall segments within each channel segment are inter-related, they have to be solved together in an equation system. According to the computation model, the following material balances are set up:

$$F_{tot}(y_{i,k-1} - y_{i,k}) - \Gamma_{i,k,0}(c_{i,k,0} - c_{i,k,1}) = 0$$

$$\Gamma_{i,k,n-1}(c_{i,k,n-1} - c_{i,k,n}) - \Gamma_{i,k,n}(c_{i,k,n} - c_{i,k,n+1}) + \sum_j v_{i,j} r_{j,k,n} w_{k,n} = 0$$

for $n \geq 1$ where $F_{tot}$ is the total molar flow, $y_{i,k}$ and $c_{i,k}$ are the molar proportion and the concentration respectively of substance i in channel segment k, $\Gamma_{i,k,0}$ and $\Gamma_{i,k,n}$ are the respective coefficients for transport of substance i from the gas flow to the first wall segment and between wall segments n and n+1 in channel segment k, $v_{i,j}$ are stoichiometric coefficients for substance i in reaction j, $r_{j,k,n}$ is the reaction velocity for reaction j in channel segment k and wall segment n, and $w_{k,n}$ is the mass of active catalyst material in channel segment k and wall segment n. The ammonia accumulation in channel segment k and wall segment n is then arrived at by the material balance:

$$N_c \frac{d\theta_{NH_3,k,n}}{dt} = \sum_j v_{i,j} r_{i,k,n}$$

where $N_c$ is the number of active seats per unit mass of catalyst.

To determine the temperature across the SCR catalyst, a heat balance for the gas and a heat balance for the catalyst are solved according to the computation model in a similar manner. The heat balance for the gas is given by:

$$F_{tot} c_p (T_{g,k-1} - T_{g,k}) - h_k A_k (T_{g,k} - T_{s,k}) = 0$$

where $T_{g,k}$ and $T_{s,k}$ are the gas temperature and catalyst temperature respectively in channel segment k, $c_p$ is the thermal capacity of the gas, $h_k$ is the heat transfer coefficient in channel segment k, and $A_k$ is the wall area in channel segment k. The heat balance for the catalyst is given by:

$$m_{s,k} c_{p,s} \frac{dT_{s,k}}{dt} = h_k A_{k,0}(T_{g,k} - T_{s,k}) + \sum_n \sum_j r_{j,k,n} w_{k,n}(-\Delta H_j)$$

where $m_{s,k}$ is the mass of catalyst in channel segment k, $c_{p,s}$ is the thermal capacity of the catalyst material, and $-\Delta H_j$ is the reaction heat for reaction j.

As a specialist in the field will appreciate, the computation model indicated above may be modified in many different ways and it is also possible to use a type of computation model other than that indicated above in order to obtain required information for calculating the accumulation actual value A1, the accumulation setpoint value A2 and, where applicable, the emission actual value E1.

FIGS. 5-9 depict flowcharts illustrating the method according to various embodiments of the present invention. The method steps illustrated in FIGS. 5-9 are effected continuously when the catalyst 4 and the relating injection device are active. As a first step, the current state of the catalyst is calculated by means of a computation model of the type indicated above. Information obtained by the calculations in the computation model is thereafter used for calculating the aforesaid accumulation actual value A1 and accumulation setpoint value A2. The accumulation actual value A1 and accumulation setpoint value A2 are then compared and on the basis of this comparison a control signal S2 for proportioning of reducing agent is generated. As a final step, proportioning and injection of reducing agent in the exhaust line are effected on the basis of said control signal S2. The amount of reducing agent injected is thus controlled on the basis of the conformity between the accumulation actual value A1 and the accumulation setpoint value A2.

Figure 5:
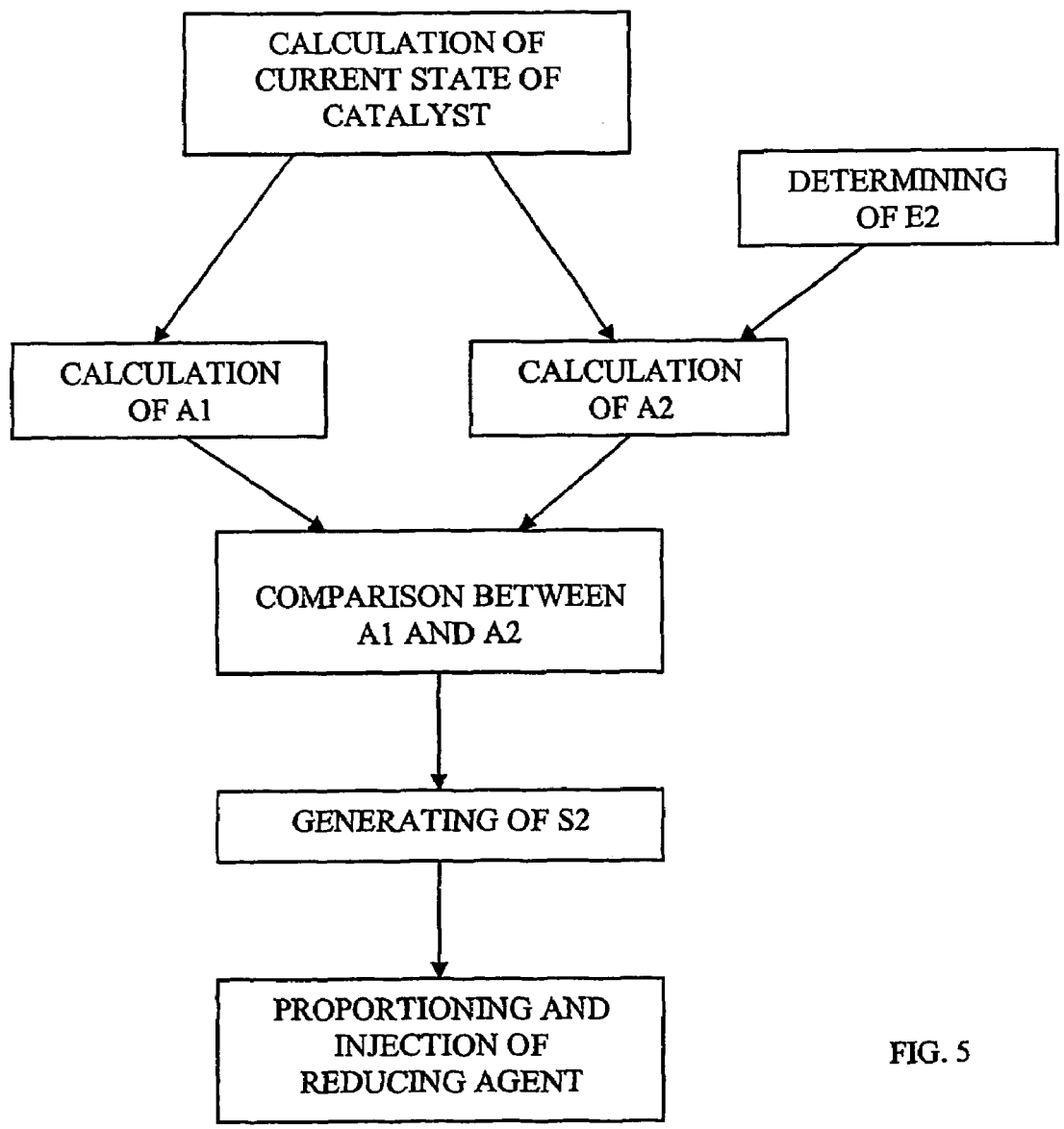

According to the embodiment illustrated in FIG. 5, an emission setpoint value E2 of the type described above is determined, whereby this emission setpoint value E2 is taken into account in calculating the accumulation setpoint value A2.

Figure 6:
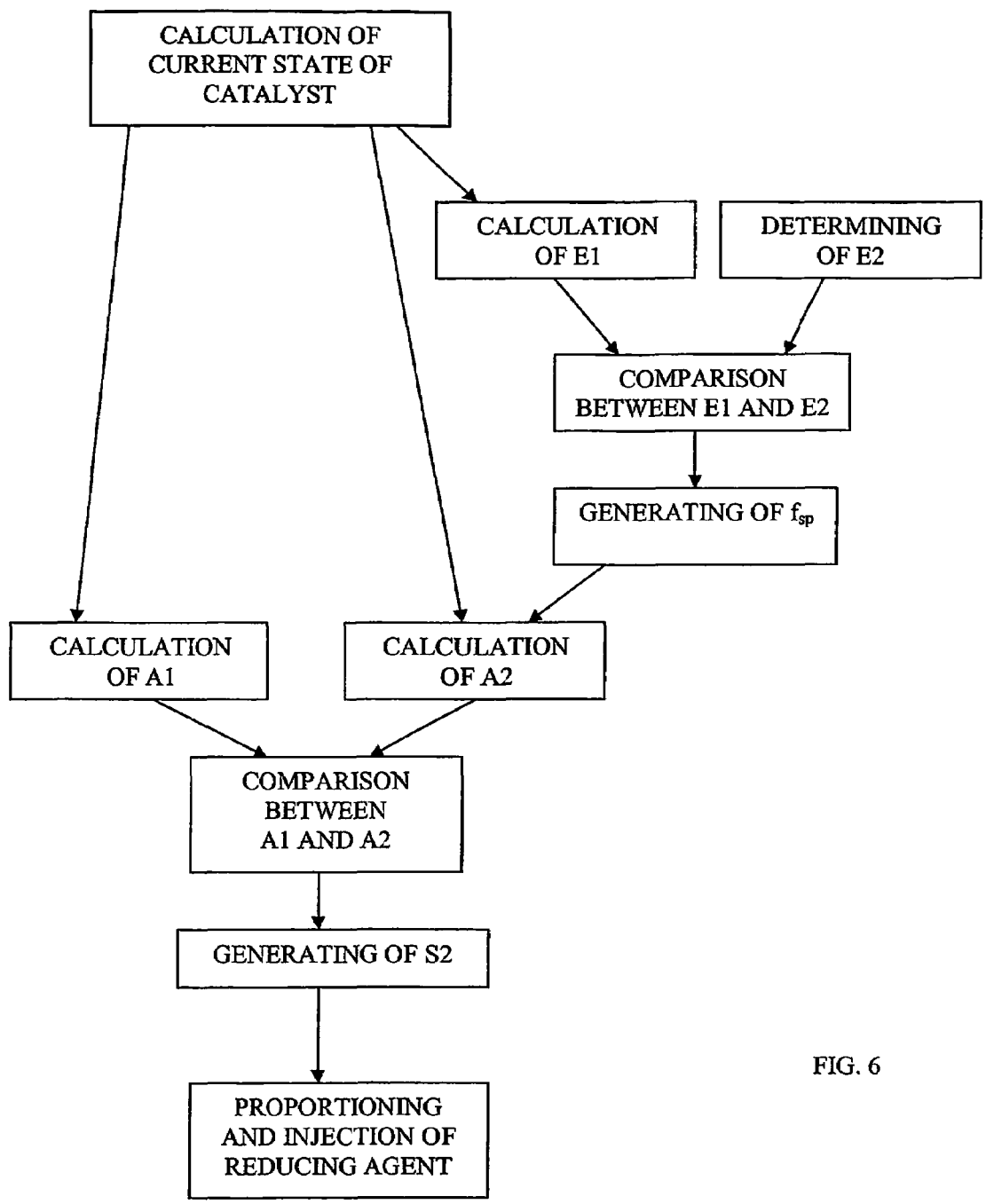

An emission setpoint value E2 is also determined in the embodiment illustrated in FIG. 6. In this embodiment, an emission actual value E1 of the type indicated above is likewise calculated on the basis of information from the computation model. This emission actual value E1 is compared with the emission setpoint value E2 and this comparison serves as the basis for generating a control signal $f_{sp}$ which is then taken into account in calculating the accumulation setpoint value A2. The calculation of the accumulation setpoint value A2 is thus affected by the conformity between the emission actual value E1 and the emission setpoint value E2.

Figure 7:
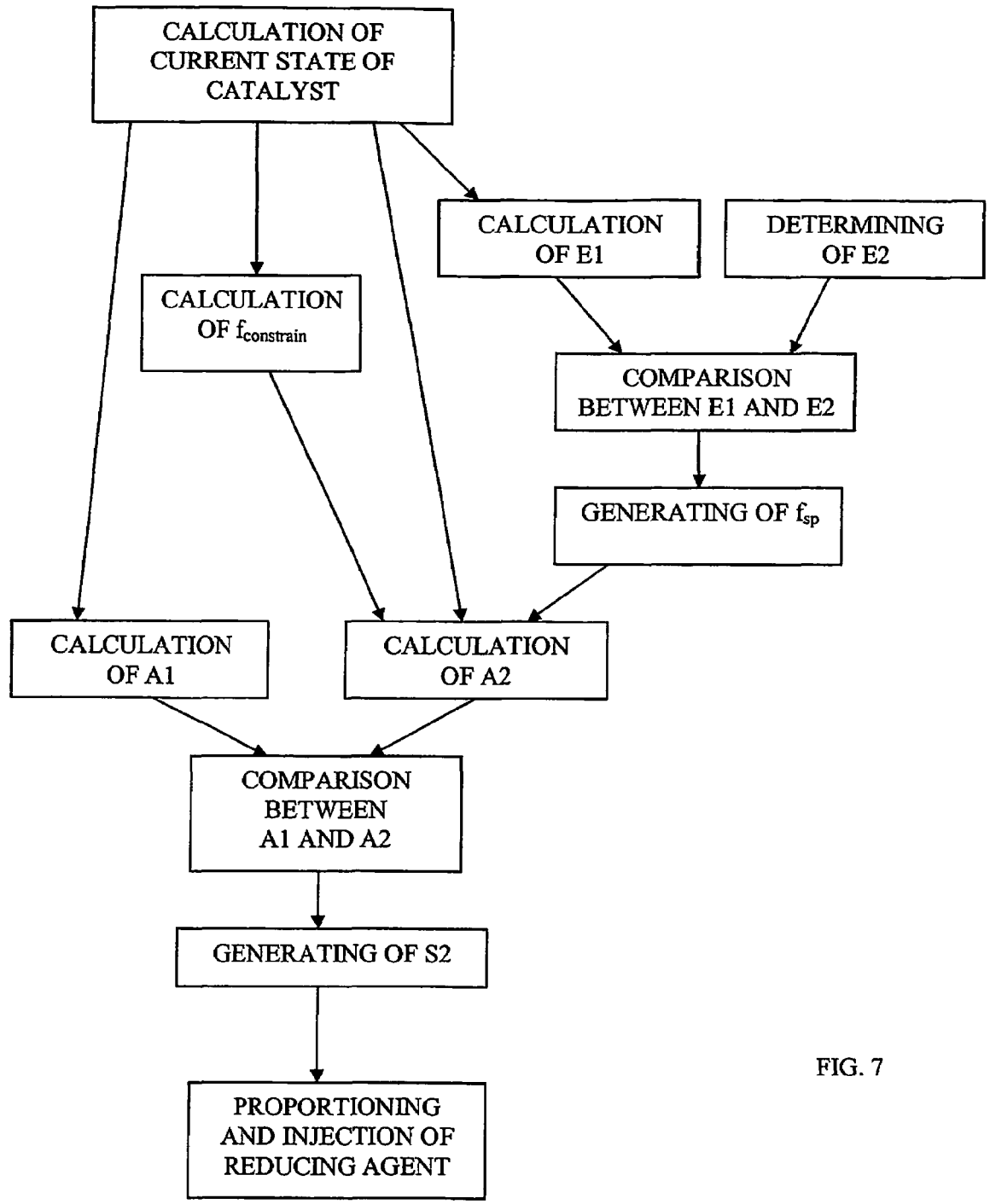

In the embodiment illustrated in FIG. 7, a limitation factor $f_{constrain}$ is calculated on the basis of information from the computation model, which limitation factor has a value which depends on an estimate of the current risk that the reducing substance content of the exhaust gases leaving the catalyst might exceed a predetermined limit value. This limitation factor $f_{constrain}$ is then taken into account in calculating the accumulation setpoint value A2 in such a way that the accumulation setpoint value A2 decreases in response to increasing risk that the reducing substance content of the exhaust gases leaving the catalyst might exceed the predetermined limit value. The limitation factor $f_{constrain}$ is used with advantage as a multiplication factor in calculating the accumulation setpoint value A2, and to this end it is given a value which ranges between 0 and 1 depending on the current risk that the reducing substance content of the exhaust gases leaving the catalyst might exceed the predetermined limit value, whereby the value of the limitation factor is close to 1 when there is no such risk and close to 0 when such risk is imminent. In this embodiment, a control signal $f_{sp}$ of the type described above is likewise taken into account in calculating the accumulation setpoint value A2.

Figure 8:
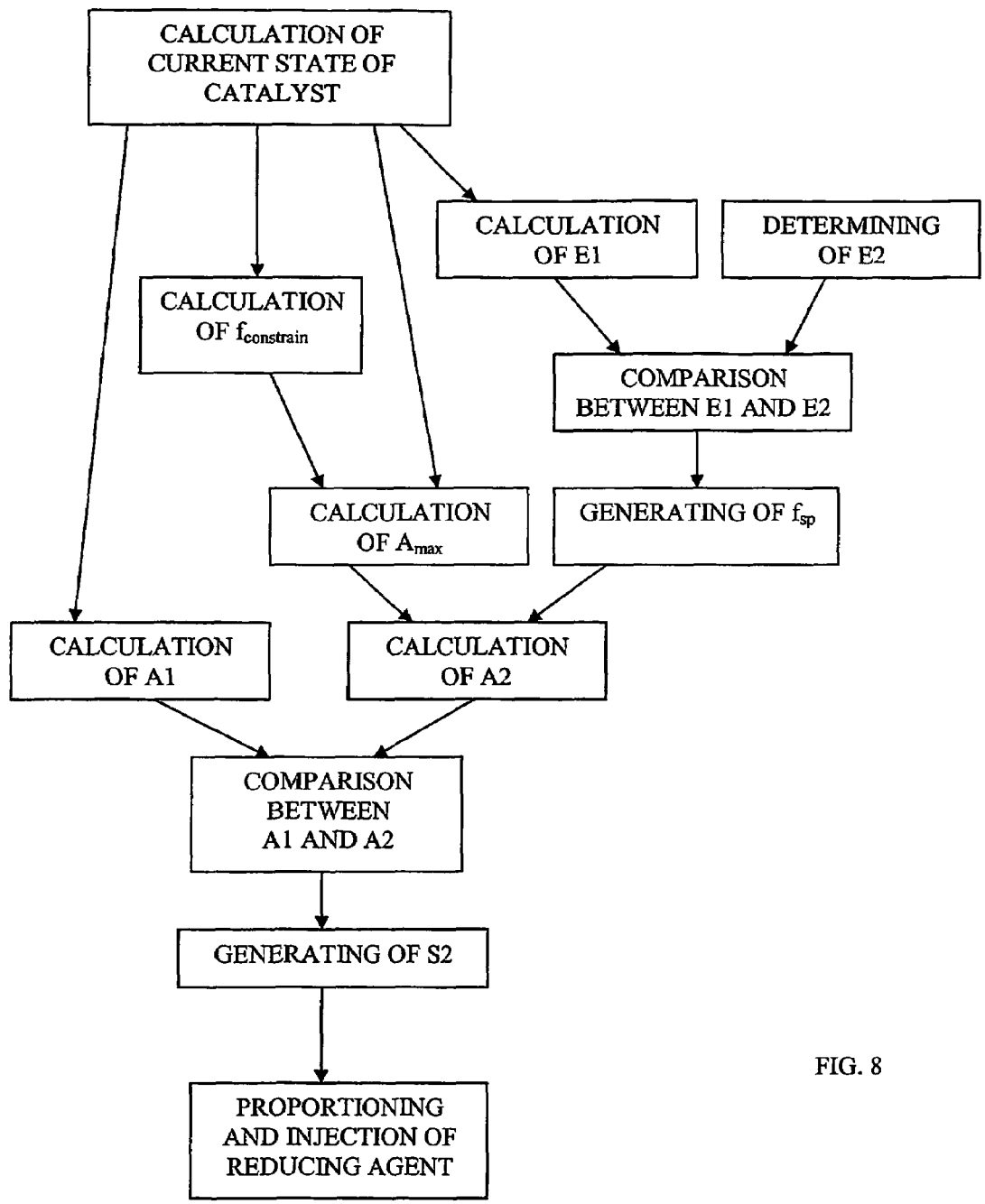

In the embodiment illustrated in FIG. 8, the accumulation setpoint value A2 is calculated by multiplication of two multiplication factors, whereby a first multiplication factor takes the form of a calculated accumulation maximum value $A_{max}$ representative of the maximum permissible reducing substance accumulation in the catalyst under prevailing operating conditions, and a second multiplication factor $f_{sp}$ depends on the conformity between the emission actual value E1 and the emission setpoint value E2. Said second multiplication factor corresponds to the control signal $f_{sp}$ indicated above. The accumulation maximum value $A_{max}$ is calculated on the basis of information from the computation model. Here again it is advantageous to calculate a limitation factor $f_{constrain}$ of the type indicated above, whereby this limitation factor $f_{constrain}$ is taken into account in calculating the accumulation maximum value $A_{max}$ in such a way that the accumulation maximum value $A_{max}$ decreases in response to increasing risk that the reducing substance content of the exhaust gases leaving the catalyst might exceed the predetermined limit value.

Maximum permissible reducing substance accumulation in the catalyst means here the greatest reducing substance accumulation which, according to calculations performed, can be permitted in the catalyst under prevailing operating conditions without the release of unconsumed reducing substance to the environment exceeding the limit value determined.

Figure 9:
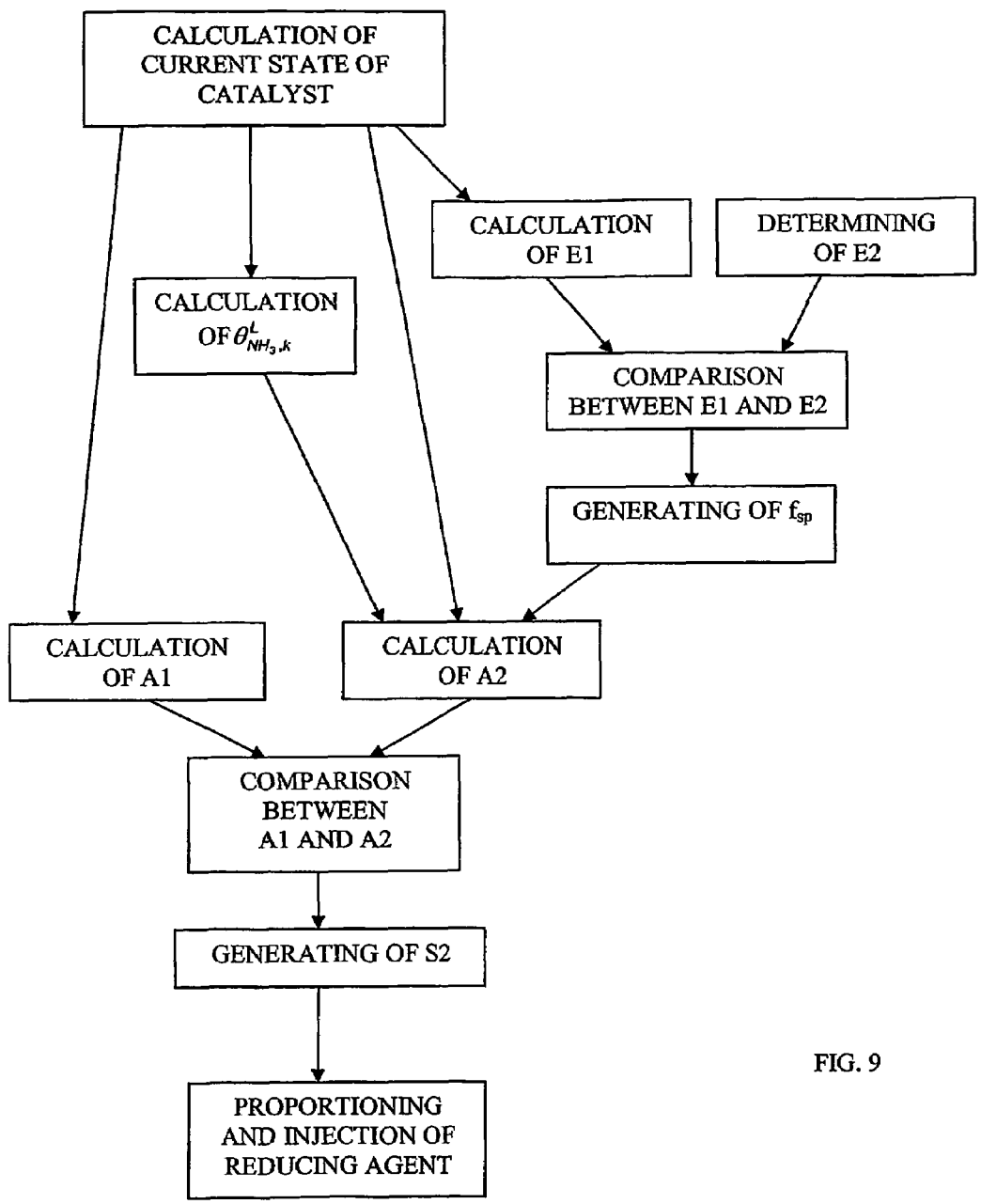

In the embodiment illustrated in FIG. 9, a limit value profile $\theta_{NH_3,k}^L$ is calculated for the ammonia accumulation along the catalyst, which is then used for determining the catalyst's capacity for $NO_x$ conversion under prevailing operating conditions. The $NO_x$ conversion capacity determined is used in calculating the accumulation setpoint value A2, thereby making it possible to act upon the accumulation setpoint value A2 in such a way as to reduce the risk that the reducing substance content of the exhaust gases leaving the catalyst might exceed a predetermined limit value. It thus becomes possible to eliminate or at least minimise the risk that undesired amounts of unconsumed reducing substance might accompany the exhaust gases leaving the catalyst and thereby reach the environment, without any limitation factor of the type indicated above having to be used. A disadvantage associated with using the previously described limitation factor is that inertia and great non-linearity of regulation occur in cases where the limitation factor changes from low to high value or from high to low value. The embodiment according to FIG. 9 is not subject to any such disadvantage and enables linear regulation with very good performance.

In a simplified variant, the method according to the invention may be so designed that the accumulation actual value A1 and the accumulation setpoint value A2 refer respectively to the current and required reducing substance accumulation in the computation model's catalyst segment situated nearest to the inlet end of the catalyst, i.e. nearest to the latter's upstream end. In this case, the accumulation actual value A1 can be obtained directly from the computation model, and the accumulation setpoint value A2 may for example be obtained by the calculation algorithm set out below, according to which the catalyst is divided in its longitudinal direction into a multiplicity of segments in a manner corresponding to the computation model indicated above. The calculation algorithm used for determining the accumulation setpoint value A2 and the accumulation actual value A1 is hereinafter called the proportioning algorithm. The first thing to determine is a limit value profile for the mole fraction of reducing substance through the catalyst:

$$y_{R,k}^L = y_{L,R} + y_{NO_x,k} - y_{NO_x,K}$$

where $y_{L,R}$ is the limit value for the mole fraction of reducing substance leaving the catalyst, and $y_{NO_x,k}$ and $y_{NO_x,K}$ are the respective mole fractions of $NO_x$ in segments k and K (K=the last segment of the catalyst). As the mole fraction for $NO_x$ decreases along the catalyst, the mole fraction for reducing substance in the limit value profile will likewise decrease along the catalyst. The limit value profile for the mole fraction of reducing substance is then used for calculating a limit value profile for accumulation of reducing substance:

$$\theta_{R,k}^L = \frac{K(T_{s,k}) \cdot c_{tot,k} \cdot y_{R,k}^L}{1 + K(T_{s,k}) \cdot c_{tot,k} \cdot y_{R,k}^L}$$

where $K(T_{s,k})$ is the equilibrium constant for adsorption of reducing substance at the temperature $T_s$ in segment k, and $c_{tot,k}$ is the total gas concentration. The equilibrium constant is determined by the ratio between the respective velocity constants $k_a(T_{s,k})$ and $k_d(T_{s,k})$ for adsorption and desorption of reducing substance:

$$K(T_{s,k}) = \frac{k_a(T_{s,k})}{k_d(T_{s,k})}$$

The ratio between complete $NO_x$ conversion and current $NO_x$ conversion is determined by:

$$f_{max} = \frac{y_{NO_x,0}}{y_{NO_x,0} - y_{NO_x,K}}$$

This ratio is used for determining the profile for the mole fraction of reducing substance in the case of complete $NO_x$ conversion:

$$y_{R,k}^{max} = y_{L,R} + f_{max}(y_{NO_x,k} - y_{NO_x,K})$$

This profile is then used for determining a corresponding reducing substance accumulation profile:

$$\theta_{R,k}^{max} = \frac{K(T_{s,k}) \cdot c_{tot,k} \cdot y_{R,k}^{max}}{1 + K(T_{s,k}) \cdot c_{tot,k} \cdot y_{R,k}^{max}}$$

Desorption velocities are calculated both for current reducing substance accumulation and for the limit value of reducing substance accumulation:

$$r_{d,k} = k_d(T_{s,k})\theta_{R,k}$$

$$r_{d,k}^L = k_d(T_{s,k})\theta_{R,k}^L$$

Thereafter, the ratio between these velocities is calculated:

$$f_{d,k} = \frac{r_{d,k}}{r_{d,k}^L}$$

The ratio is used for determining a limitation factor:

$$f_{constrain} = \frac{1}{1 + (c_1^{tune} f_{d,a} + c_2^{tune} f_{d,b})^{c_3^{tune}}}$$

where segments a and b and the parameters $c_1^{tune}$, $c_2^{tune}$ and $c_3^{tune}$ can respectively be selected and trimmed in order to achieve optimum functioning. The limitation factor has the characteristics of being close to unity when the accumulation of reducing substance is small relative to the accumulation limit value. When the accumulation is close to the limit value, the value of the limitation factor decreases. The accumulation setpoint value A2 is finally determined by:

$$A2 = A_{max} \cdot f_{SP} = \theta_{R,1}^{max} \cdot f_{constrain} \cdot f_{SP}$$

where $f_{SP}$ is the control signal from the outer regulating circuit 12b. Here it may be seen that the limitation factor affects the accumulation setpoint value A2. When the reducing substance accumulation is close to the limit value, the accumulation setpoint value A2 will thus decrease until a state of equilibrium obtains. In this case the accumulation actual value A1 is the accumulation of reducing substance in the first segment of the catalyst:

$$A1 = \theta_{R,1}$$

In the proportioning algorithm formulae set out above, R denotes the current reducing substance. In cases where the reducing substance takes the form of ammonia, R therefore stands for $NH_3$.

With this simple variant of the proportioning algorithm it is possible to achieve rapid regulation of the accumulation of the reducing substance in the catalyst. As it is the reducing substance accumulation in the catalyst's first segment that is regulated, the response to changes in proportioning of reducing agent is rapid. It is also possible to trim the regulation so that the amount of reducing substance leaving the catalyst without reacting is constantly below the limit value, since a limitation factor lowers the accumulation setpoint value A2 when the accumulation of reducing substance is close to the limit value. The principal disadvantage of this simple proportioning algorithm variant is that the internal control state, i.e. the reducing substance accumulation in the catalyst, is not directly representative of the $NO_x$ conversion in the catalyst. As the $NO_x$ conversion is temperature-dependent, more accumulation at lower temperatures is required for achieving the same $NO_x$ conversion. This means that it is the outer regulating circuit 12b that has to compensate the accumulation setpoint value A2 in response to temperature changes. Another problem is that temperature changes cause the temperature along the catalyst to vary and the reducing substance to be consumed at different rates in different parts of the catalyst. As the internal control state is only related to the first segment of the catalyst, the variations across the catalyst have to be compensated by the outer regulating circuit 12b.

In a more refined variant, the method according to the invention may be so designed:

that for each of the segments of the computation model an accumulation actual value $A_k$ and a conversion value $R_{max,k}$ are calculated, whereby the accumulation actual value $A_k$ is representative of the maximum reducing substance accumulation in the segment which is permitted under prevailing operating conditions, and the conversion value $R_{max,k}$ is representative of the expected exhaust gas substance conversion in the segment when the reducing substance accumulation in the segment corresponds to the accumulation value $A_k$, that the conversion values $R_{max,k}$ for the various segments are summated, and that the resulting sum is converted to a fictitious value for the maximum permissible reducing substance accumulation in the segment situated nearest to the inlet end of the catalyst, whereby this fictitious value constitutes the aforesaid accumulation maximum value $A_{max}$.

The accumulation maximum value $A_{max}$ thus obtained then serves as the basis for arriving at the accumulation setpoint value A2 in the manner indicated above by multiplication by a multiplication factor $f_{sp}$ which depends on the conformity between the emission actual value E1 and the emission setpoint value E2.

A limitation factor $f_{constrain,k}$ of the type described above is with advantage calculated for each of the segments, whereby this limitation factor $f_{constrain,k}$ is taken into account in calculating the conversion values $R_{max,k}$ in such a way that the conversion values decrease in response to increasing risk that the reducing substance content of the exhaust gases leaving the catalyst might exceed the predetermined limit value.

A value $R_k$ for the current conversion of the exhaust gas substance in the segment is further calculated for each of the segments. A value $R_{tot}$ for the total current conversion of the exhaust gas substance in the catalyst is then calculated by summating the values $R_k$ of the various segments, followed by converting the value $R_{tot}$ thus obtained for the total current conversion of the exhaust gas substance in the catalyst to a fictitious value for the current reducing substance accumulation in the segment situated nearest to the inlet end of the catalyst, whereby this fictitious value constitutes the accumulation actual value A1.

In this refined variant, the internal control state provides a representative measure of the $NO_x$ conversion through the whole catalyst. In this case the proportioning algorithm will be related to how the computation model for the catalyst is formulated. The following example illustrates how the proportioning algorithm might be designed if the reducing substance is ammonia and the computation model for the catalyst comprises the following reactions with relating reaction velocities:

$$S + NH_3 \rightarrow S\text{---}NH_3 \quad r_1 = k_1 c_{NH_3} \theta_V \qquad (1)$$

$$S\text{---}NH_3 \rightarrow S + NH_3 \quad r_2 = k_2 \theta_{NH_3} \qquad (2)$$

$$4\, S\text{---}NH_3 + 4\, NO + O_2 \rightarrow 4\, S + 4\, N_2 + 6\, H_2O$$
$$r_3 = k_3 c_{NO} \theta_{NH_3} \qquad (3)$$

$$4\, S\text{---}NH_3 + 5\, O_2 \rightarrow 4\, S + 6\, H_2O + 4\, NO \quad r_4 = k_4 c_{O_2} \theta_{NH_3} \qquad (4)$$

The reaction velocities are given per unit mass of catalyst. Summating the reaction velocity for reaction 3 ($NO_x$ conversion) multiplied by the catalyst mass in the respective segments, and then dividing the result by the expression for the reaction velocity in the first segment multiplied by the catalyst mass but with the accumulation of ammonia omitted, provides a measure of the $NO_x$ conversion through the whole catalyst, expressed in ammonia accumulation for the first segment in the catalyst, which constitutes the current value of the internal control state, i.e. the accumulation actual value A1:

$$A1 = \Phi_{NH_3}$$
$$= \frac{\sum_{k=1}^{K} k_3(T_{s,k}) \cdot c_{tot,k} \cdot y_{NOx,k} \cdot \theta_{NH_3,k} \cdot w_k}{k_3(T_{s,1}) \cdot c_{tot,1} \cdot y_{NOx,k} \cdot w_1}$$

The setpoint value for the internal control state, i.e. the accumulation setpoint value A2, is determined in a similar manner:

$$A2 = \Phi_{SP,NH_3}$$
$$= f_{SP} \cdot \frac{\sum_{k=1}^{K} f_{constrain,k} \cdot k_3(T_{s,k}) \cdot c_{tot,k} \cdot y_{NOx,k} \cdot \theta_{NH_3,k}^{max} \cdot w_k}{k_3(T_{s,1}) \cdot c_{tot,1} \cdot y_{NOx,k} \cdot w_1}$$

where $\theta_{NH_3,k}^{max}$ may be determined in the same way as $\theta_{R,k}^{max}$ in the proportioning algorithm described above in the simplified variant of the method according to the invention. The limitation factors may be given different values for each segment according to:

$$f_{constrain,k} = \frac{1}{1 + c_k^{tune} \cdot f_{d,k}}.$$

where $f_{d,k}$ is determined in the same manner as in the proportioning algorithm described above in the simplified variant of the method according to the invention, and where the parameter $c_k^{tune}$ may be trimmed differently for each segment.

This refined variant has the same advantages as the simplified variant. It is possible to achieve rapid regulation of the internal control state, since the latter is closely related to the reducing substance accumulation in the first segment of the catalyst. The proportioning algorithm can also be trimmed so that the amount of reducing substance leaving the catalyst without reacting is constantly below the limit value, since the limitation factors lower the accumulation setpoint value A2 when the reducing substance accumulation is close to the limit value. In contrast to the simplified variant, the internal control state in the refined proportioning algorithm is related to the $NO_x$ conversion. This means that the accumulation setpoint value A2 is automatically adjusted when the temperature changes. The fact that the internal control state is related to the $NO_x$ conversion through the whole catalyst means that the proportioning algorithm is also able to compensate for varying consumption of reducing substance in different parts of the catalyst, caused by temperature variations along the catalyst. The refined proportioning algorithm is thus able to compensate for most of the variations which may occur along the catalyst, which means that the outer regulating circuit 12b need only make minor adjustments to the accumulation setpoint value A2 in order to hold the $NO_x$ emission at a desired level.

A possible implementation of the embodiment according to FIG. 9 is described in more detail below on the basis that the reducing substance is ammonia, whereby the computation model for the catalyst comprises the following reactions with relating reaction velocities:

$$S + NH_3 \rightarrow S\text{—}NH_3 \quad r_1 = k_1 c_{NH_3} \theta_V$$

$$S\text{—}NH_3 \rightarrow S + NH_3 \quad r_2 = k_2 \theta_{NH_3}$$

$$4\, S\text{—}NH_3 + 4\, NO + O_2 \rightarrow 4\, S + 4\, N_2 + 6\, H_2O$$
$$r_3 = k_3 c_{NO} \theta_{NH_3}$$

Information from the catalyst model is used for estimating the $NO_x$ conversion capacity of the catalyst. Surface concentration factors $\eta$ for $NO_x$ and ammonia are calculated as follows:

$$\eta_{NO_x,k} = \frac{y_{NO_x,k,s}}{y_{NO_x,k,g}}$$

$$\eta_{NH_3,k} = \frac{y_{NH_3,k,s}}{y_{NH_3,k,g}}$$

where $y_{NO_x,k,s}$ and $y_{NO_x,k,g}$ are the respective $NO_x$ mole fractions on the internal wall surface and in the gas flow in channel segment k, and $y_{NH_3,k,s}$ and $y_{NH_3,k,g}$ are the respective $NH_3$ mole fractions on the internal wall surface and in the gas flow in channel segment k. The denominators are monitored if they are nil and in such cases the surface concentration factor is set at 1, i.e.:

$$y_{NO_x,k,g} = 0 \Rightarrow \eta_{NO_x,k} = 1$$

$$y_{NH_3,k,g} = 0 \Rightarrow \eta_{NH_3,k} = 1$$

An ammonia concentration factor $f_{NH_3,k}$ is calculated as follows:

$$f_{NH_3,k} = \frac{y_{NH_3,k,g}}{y_{NH_3,k,g} + 2 \cdot y_{Urea,k,g}}$$

where $y_{Urea,k,g}$ is the mole fraction of urea in the gas flow in channel segment k.

An iterative procedure is used thereafter for determining the limit value profile $\theta_{NH_3,k}^L$ for the ammonia accumulation along the catalyst. In the first iteration, the derivative for the molar limit value fraction of $NO_x$ relative to the molar limit value fraction of ammonia is set at an initial value:

$$\left[\frac{dy_{NO_x}^L}{dy_{NH_3}^L}\right]^1 = -0.5$$

In the subsequent iterations, this derivative is calculated as follows:

$$\frac{dy_{NO_x}^L}{d\theta_{NH_3}^L} = -\frac{y_{NO_x,1} \cdot \theta_{NH_3,1} \cdot y_{NO_x,0}(y_{NO_x,0} - y_{NO_x,1})}{\left(\theta_{NH_3,1}^L(y_{NO_x,0} - y_{NO_x,1}) + y_{NO_x,1} \cdot \theta_{NH_3,1}\right)^2}$$

$$\frac{d\theta_{NH_3}^L}{dy_{NH_3}^L} = \frac{k_1(T_{s,1}) \cdot c_{tot,1} \cdot \eta_{NH_3,1}(k_2(T_{s,1}) + v_3 \cdot k_3(T_{s,1}) \cdot c_{tot,1} \cdot y_{NO_x,1}^L \cdot \eta_{NO_x,1})}{(k_1(T_{s,1}) \cdot c_{tot,1} \cdot y_{NH_3,1}^L \cdot \eta_{NH_3,1} + k_2(T_{s,1}) + v_3 \cdot k_3(T_{s,1}) \cdot c_{tot,1} \cdot y_{NO_x,1}^L \cdot \eta_{NO_x,1})^2}$$

$$\left[\frac{dy_{NO_x}^L}{dy_{NH_3}^L}\right]^{update} = \begin{cases} -1 & \frac{dy_{NO_x}^L}{d\theta_{NH_3}^L} \cdot \frac{d\theta_{NH_3}^L}{dy_{NH_3}^L} \leq -1 \\ \frac{dy_{NO_x}^L}{d\theta_{NH_3}^L} \cdot \frac{d\theta_{NH_3}^L}{dy_{NH_3}^L} & -1 < \frac{dy_{NO_x}^L}{d\theta_{NH_3}^L} \cdot \frac{d\theta_{NH_3}^L}{dy_{NH_3}^L} < 0 \\ 0 & \frac{dy_{NO_x}^L}{d\theta_{NH_3}^L} \cdot \frac{d\theta_{NH_3}^L}{dy_{NH_3}^L} \geq 0 \end{cases}$$

$$\left[\frac{dy_{NO_x}^L}{dy_{NH_3}^L}\right]^i = f^i \cdot \left[\frac{dy_{NO_x}^L}{dy_{NH_3}^L}\right]^{i-1} + (1 - f^i) \cdot \left[\frac{dy_{NO_x}^L}{dy_{NH_3}^L}\right]^{update}$$

In each iteration the following calculations are also done:

$$f^{L,update} = \frac{y_{NO_x,0} - y_{NO_x,1} - \left[\frac{dy_{NO_x}^L}{dy_{NH_3}^L}\right]^i \cdot (2y_{L,NH_3} + y_{NO_x,1} - y_{NO_x,K})}{y_{NO_x,0} - y_{NO_x,1} + \left[\frac{dy_{NO_x}^L}{dy_{NH_3}^L}\right]^i \cdot (y_{NO_x,1} - y_{NO_x,K})}$$

$$f^L = \begin{cases} 0 & f^{L,update} \leq 0 \\ f^{L,update} & 0 < f^{L,update} < \frac{y_{NO_x,0}}{y_{NO_x,0} - y_{NO_x,K}} \\ \frac{y_{NO_x,0}}{y_{NO_x,0} - y_{NO_x,K}} & f^{L,update} \geq \frac{y_{NO_x,0}}{y_{NO_x,0} - y_{NO_x,K}} \end{cases}$$

-continued $$y_{NH_3,k}^L = y_{L,NH_3} + f^L \cdot f_{NH_3,k} \cdot (y_{NO_x,k} - y_{NO_x,K})$$

$$y_{NO_x,k}^L = y_{NO_x,0} - f^L \cdot (y_{NO_x,0} - y_{NO_x,k})$$

$$\theta_{NH_3,k}^L = \frac{k_1(T_{s,k}) \cdot c_{tot,k} \cdot y_{NH_3,k}^L \cdot \eta_{NH_3,k}}{k_1(T_{s,k}) \cdot c_{tot,k} \cdot y_{NH_3,k}^L \cdot \eta_{NH_3,k} + k_2(T_{s,k}) + v_3 \cdot k_3(T_{s,k}) \cdot c_{tot,k} \cdot y_{NO_x,k}^L \cdot \eta_{NO_x,k}}$$

In the above formulae, $y_{L,NH_3}$ is the permissible limit value for the mole fraction of ammonia after the catalyst, $T_{s,k}$ and $c_{tot,k}$ respectively are the catalyst temperature and the total gas concentration in channel segment k, $V_3$ is the stoichiometric coefficient for ammonia in the $NO_x$ reduction reaction, and f L is a capacity factor which describes the ratio between $NO_x$ conversion at the catalyst's capacity limit and current $NO_x$ conversion. The calculation converges quickly and four iterations are sufficient. An iteration factor f is used for stabilising the calculation, and suitable values for this iteration factor in iterations two to four are $f^2=0.2$, $f^3=0.1$ and $f^4=0$.

The resulting limit value profile $\theta_{NH_3,k}^L$ for ammonia accumulation along the catalyst can thereafter be used in regulating in order to determine the $NO_x$ conversion capacity of the catalyst under current operating conditions. This capacity is taken into account in calculating the accumulation setpoint value A2. Examples of conceivable formulae for determining the accumulation actual value A1 and the accumulation setpoint value A2 when implementing the embodiment according to FIG. 9 appear below.

In this case the accumulation actual value A1 is calculated from the $NO_x$ conversion in the first wall segment in all the channel segments along the catalyst, converted to an ammonia accumulation in the first wall segment of the first channel segment, according to the following formula:

$$A1 = \Phi_{NH_3}$$

$$= \frac{\sum_{k=1}^{K} k_3(T_{s,k}) \cdot c_{tot,k} \cdot y_{NO_x,k} \cdot \eta_{NO_x,k} \cdot \theta_{NH_3,k} \cdot w_k}{k_3(T_{s,1}) \cdot c_{tot,1} \cdot y_{NO_x,1} \cdot \eta_{NO_x,k} \cdot w_1}$$

where $w_k$ is the mass of active catalyst material in channel segment k. In the formula set out above, the numerator provides a measure of the catalyst's current $NO_x$.

The accumulation setpoint value A2 is obtained by an analogous calculation using the limit value profile $\theta_{NH_3,k}^L$ for the ammonia accumulation:

$$A2 = \Phi_{SP,NH_3}$$

$$= f_{SP} \frac{\sum_{k=1}^{K} k_3(T_{s,k}) \cdot c_{tot,k} \cdot y_{NO_x,k} \cdot \eta_{NO_x,k} \cdot \theta_{NH_3,k}^L \cdot w_k}{k_3(T_{s,1}) \cdot c_{tot,1} \cdot y_{NO_x,1} \cdot \eta_{NO_x,1} \cdot w_1}$$

In the above formula, the numerator provides a measure of the catalyst's $NO_x$ conversion capacity under prevailing operating conditions.

The invention is of course in no way limited to the preferred embodiments described above, since a multiplicity of possibilities for modifications thereof are likely to be obvious to a specialist in the field without having thereby to deviate from the basic concept of the invention such as it is defined in the attached claims. The exhaust system may for example comprise at least one additional catalyst connected in series with the reduction catalyst 4, e.g. an oxidation catalyst and/or a hydrolysis catalyst upstream from the reduction catalyst and/or a slip catalyst downstream from the reduction catalyst.

The invention claimed is:

1. A method for controlling injection of a reducing agent upstream from a catalyst in an exhaust line from a combustion engine, the method comprising:

calculating an accumulation actual value (A1) representative of a current accumulation in the catalyst of a reducing substance forming part of or formed by the reducing agent based on information from a computation model, wherein the model takes into account expected reactions in the catalyst under prevailing operating conditions, and the model continuously determines the current state of the catalyst, calculating an accumulation setpoint value (A2) based on an emission setpoint value (E2) and information from the computation model, wherein the emission setpoint value (E2) is representative of a desired content, in exhaust gases leaving the catalyst, of an exhaust gas substance which, as the exhaust gases pass through the catalyst, is at least partly removed from the exhaust gases by the action of the reducing substance or formed by the action of the reducing substance, and the accumulation setpoint value (A2) is representative of the reducing substance accumulation required in the catalyst under prevailing operating conditions for substantially achieving the emission setpoint value (E2), calculating a limitation factor ($f_{constrain}$), wherein the limitation factor has a value which depends on an estimate of the current risk that the reducing substance content of the exhaust gases leaving the catalyst might exceed a predetermined limit value, using the limitation factor in calculating the accumulation setpoint value (A2) in such a way that the accumulation setpoint value (A2) decreases in response to increasing risk that the reducing substance content of the exhaust gases leaving the catalyst might exceed the predetermined limit value comparing the accumulation actual value (A1) with the accumulation setpoint value (A2), and controlling the injection of reducing agent in the exhaust line based on the comparison between the accumulation actual value (A1) and the accumulation setpoint value (A2).

2. A method according to claim 1, further comprising using the limitation factor ($f_{constrain}$) as a multiplication factor in calculating the accumulation setpoint value (A2), wherein the limitation factor is given a value which varies between 0 and 1 depending on the current risk that the reducing substance content of the exhaust gases leaving the catalyst might exceed the predetermined limit value, and wherein the value of the limitation factor is close to 1 when there is no such risk and close to 0 when such risk is imminent.

3. A method for controlling injection of a reducing agent upstream from a catalyst in an exhaust line from a combustion engine, the method comprising:

calculating an accumulation actual value (A1) representative of a current accumulation in the catalyst of a reducing substance forming part of or formed by the reducing agent based on information from a computation model, wherein the model takes into account expected reactions in the catalyst under prevailing operating conditions, and the model continuously determines the current state of the catalyst, calculating an accumulation setpoint value (A2) based on an emission setpoint value (E2) and information from the computation model, wherein the emission setpoint value (E2) is representative of a desired content, in exhaust gases leaving the catalyst, of an exhaust gas substance which, as the exhaust gases pass through the catalyst, is at least partly removed from the exhaust gases by the action of the reducing substance or formed by the action of the reducing substance, and the accumulation setpoint value (A2) is representative of the reducing substance accumulation required in the catalyst under prevailing operating conditions for substantially achieving the emission setpoint value (E2), comparing the accumulation actual value (A1) with the accumulation setpoint value (A2) by supplying the accumulation actual value (A1) and the accumulation setpoint value (A2) to a first comparator, which emits a signal (S1) to a first regulator, wherein the signal (S1) depends on the conformity between the accumulation actual value (A1) and the accumulation setpoint value (A2), controlling the injection of reducing agent in the exhaust line based on the comparison between the accumulation actual value (A1) and the accumulation setpoint value (A2) by emitting a control signal (S2) from the first regulator based on the signal from the comparator for controlling the injection of reducing agent in the exhaust line based on the control signal (S2).

4. A method according to claim 3, further comprising calculating an NOx conversion capacity of the catalyst under prevailing operating conditions based on from the computation model and taking the NOx conversion capacity into account in calculating the accumulation setpoint value (A2).

5. A method according to claim 3, wherein according to the computation model, the catalyst is divided in its longitudinal direction into a multiplicity of segments, and wherein the accumulation actual value (A1) and the accumulation setpoint value (A2) refer respectively to current and required reducing substance accumulation in the segment situated nearest to an inlet end of the catalyst.

6. A method according to claim 3, wherein the emission setpoint value (E2) is calculated on the basis of prevailing operating conditions.

7. A method according to claim 3, further comprising using at least the following parameters in the computation model when generating information for the calculation of the accumulation actual value (A1) and the accumulation setpoint value (A2):
    exhaust gas temperature (P1) upstream from the catalyst,
    concentration (P2) of the exhaust gas substance in the exhaust gases upstream from the catalyst,
    exhaust mass flow (P3) through the catalyst, and
    an amount (P4) of reducing agent injected.

8. A method according to claim 3, wherein urea or ammonia is used as reducing agent, whereby the reducing substance takes the form of ammonia.

9. A method according to claim 3, wherein the exhaust gas substance takes the form of NOx.

10. A method according to claim 3, wherein continuously determining the current state of the catalyst includes the accumulation of the reducing substance in different parts of the catalyst and the conversion of exhaust gas substance taking place in different parts of the catalyst.

11. A method for controlling injection of a reducing agent upstream from a catalyst in an exhaust line from a combustion engine ,the method comprising:

calculating an accumulation actual value (A1) representative of a current accumulation in the catalyst of a reducing substance forming part of or formed by the reducing agent based on information from a computation model, wherein the model takes into account expected reactions in the catalyst under prevailing operating conditions, and the model continuously determines the current state of the catalyst, calculating an accumulation setpoint value (A2) based on an emission setpoint value (E2) and information from the computation model, wherein the emission setpoint value (E2) is representative of a desired content, in exhaust gases leaving the catalyst, of an exhaust gas substance which, as the exhaust gases pass through the catalyst, is at least partly removed from the exhaust gases by the action of the reducing substance or formed by the action of the reducing substance, and the accumulation setpoint value (A2) is representative of the reducing substance accumulation required in the catalyst under prevailing operating conditions for substantially achieving the emission setpoint value (E2), comparing the accumulation actual value (A1) with the accumulation setpoint value (A2), and controlling the injection of reducing agent in the exhaust line based on the comparison between the accumulation actual value (A1) and the accumulation setpoint value (A2)

determining an emission actual value (E1) by calculation or measurement, wherein the emission actual value (E1) is representative of the current content of the exhaust gas substance in the exhaust gases leaving the catalyst, comparing the emission actual value (E1) with the emission setpoint value (E2), supplying the emission actual value (E1) and the emission setpoint value (E2) to a second comparator which emits a regulator signal (S3) to a second regulator, wherein the regulator signal (S3) depends on the conformity between the emission actual value (E1) and the emission setpoint value (E2), and emitting a control signal ($f_{SP}$) from the second regulator based on the signal from the second comparator, wherein the control signal ($f_{SP}$) affects a calculation of the accumulation setpoint value (A2) and calculating the accumulation setpoint value (A2) on information from the computation model and the conformity between the emission actual value (E1) and the emission setpoint value (E2).

12. A method according to claim 11, wherein the emission actual value (E1) is calculated by means of the computation model or on the basis of information from the computation model.

13. A method for controlling injection of a reducing agent upstream from a catalyst in an exhaust line from a combustion engine, the method comprising:

calculating an accumulation actual value (A1) representative of a current accumulation in the catalyst of a reducing substance forming part of or formed by the reducing agent based on information from a computation model, wherein the model takes into account expected reactions in the catalyst under prevailing operating conditions, and the model continuously determines the current state of the catalyst, calculating an accumulation setpoint value (A2) based on an emission setpoint value (E2) and information from the computation model, wherein the emission setpoint value (E2) is representative of a desired content, in exhaust gases leaving the catalyst, of an exhaust gas substance which, as the exhaust gases pass through the catalyst, is at least partly removed from the exhaust gases by the action of the reducing substance or formed by the action of the reducing substance, and the accumulation setpoint value (A2) is representative of the reducing substance accumulation required in the catalyst under prevailing operating conditions for substantially achieving the emission setpoint value (E2), obtaining the accumulation setpoint value (A2) by multiplying a first multiplication factor in the form of a calculated accumulation maximum value ($A_{max}$) which is representative of the maximum permissible reducing substance accumulation in the catalyst under prevailing operating conditions, with a second multiplication factor which depends on the conformity between the emission actual value (E1) and the emission setpoint value (E2)

comparing the accumulation actual value (A1) with the accumulation setpoint value (A2), and controlling the injection of reducing agent in the exhaust line based on the comparison between the accumulation actual value (A1) and the accumulation setpoint value (A2)

determining an emission actual value (E1) by calculation or measurement, wherein the emission actual value (E1) is representative of the current content of the exhaust gas substance in the exhaust gases leaving the catalyst, comparing the emission actual value (E1) with the emission setpoint value (E2), and calculating the accumulation setpoint value (A2) on information from the computation model and the conformity between the emission actual value (E1) and the emission setpoint value (E2).

14. A method according to claim 13, wherein according to the computation model, the catalyst is divided in its longitudinal direction into a multiplicity of segments, and wherein the accumulation maximum value ($A_{max}$) refers to the maximum permissible reducing substance accumulation under prevailing operating conditions in the segment situated nearest to an inlet end of the catalyst.

15. A method according to claim 13, further comprising calculating a limitation factor ($f_{constrain}$) which has a value which depends on an estimate of the current risk that the reducing substance content in the exhaust gases leaving the catalyst might exceed a predetermined limit value, and taking the limitation factor ($f_{constrain}$) into account in calculating the accumulation maximum value ($A_{max}$) such that the accumulation maximum value ($A_{max}$) decreases in response to increasing risk that the reducing substance content of the exhaust gases leaving the catalyst might exceed the predetermined limit value.

16. A method according to claim 15, further comprising using the limitation factor ($f_{constrain}$) as a multiplication factor in calculating the accumulation maximum value ($A_{max}$), wherein the limitation factor is given a value which varies between 0 and 1 depending on the current risk that the reducing substance content of the exhaust gases leaving the catalyst might exceed the predetermined limit value, and wherein the value of the limitation factor is close to 1 when there is no such risk and close to 0 when such risk is imminent.

17. A method according to claim 13, wherein according to the computation model, dividing the catalyst in its longitudinal direction into a multiplicity of segments, for each of the segments of the computation model, calculating an accumulation value ($A_k$) and a conversion value ($R_{max,k}$) wherein the accumulation value ($A_k$) is representative of the maximum permissible reducing substance accumulation in the segment under prevailing operating conditions, and the conversion value ($R_{max,k}$) is representative of the expected conversion of the exhaust gas substance in the segment when the reducing substance accumulation in the segment corresponds to the accumulation value, summing the conversion values ($R_{max,k}$) for the various segments, and converting the resulting sum to a fictitious value for the maximum permissible reducing substance accumulation in the segment situated nearest to the inlet end of the catalyst, wherein the fictitious value constitutes said accumulation maximum value ($A_{max}$).

18. A method according to claim 17, further comprising for each of the segments, calculating a limitation factor ($f_{constrain,k}$), which has a value which depends on an estimate of the current risk that the reducing substance content of the exhaust gases leaving the catalyst might exceed a predetermined limit value, and taking the limitation factor ($f_{constrain,k}$) into account in calculating the conversion values ($R_{max,k}$) such that the conversion values ($R_{max,k}$) decrease in response to increasing risk that the reducing substance content of the exhaust gases leaving the catalyst might exceed the predetermined limit value.

19. A method according to claim 18, further comprising using the limitation factor ($f_{constrain,k}$) as a multiplication factor in calculating the conversion value ($R_{max,k}$), wherein the limitation factor is given a value which varies between 0 and 1 depending on the current risk of the reducing substance content of the exhaust gases leaving the catalyst might exceed the predetermined limit value, wherein the value of the limitation factor is close to 1 when there is no such risk and close to 0 when such risk is imminent.

20. A method according to claim 17, further comprising calculating for each of the segments a value ($R_k$) for the current conversion of the exhaust gas substance in the segment, calculating a value ($R_{tot}$) for the total current conversion of the exhaust gas substance in the catalyst is calculated by summation of the values ($R_k$) of the various segments, and converting the value ($R_{tot}$) for the total current conversion of the exhaust gas substance in the catalyst to a fictitious value of the current reducing substance accumulation in the segment situated nearest to an inlet end of the catalyst, wherein the fictitious value constitutes the accumulation actual value (A1).

* * * * *